US011422911B2

(12) United States Patent
Carbonell et al.

(10) Patent No.: US 11,422,911 B2
(45) Date of Patent: Aug. 23, 2022

(54) ASSISTED SMART DEVICE CONTEXT PERFORMANCE INFORMATION RETRIEVAL

(71) Applicant: International Business Machines Corporation, Armonk, NY (US)

(72) Inventors: Lee A. Carbonell, Flower Mound, TX (US); Jeff Edgington, Fort Worth, TX (US); Tsz S. Cheng, Grand Prairie, TX (US); Pandian Mariadoss, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 16/353,158

(22) Filed: Mar. 14, 2019

(65) Prior Publication Data

US 2020/0293423 A1 Sep. 17, 2020

(51) Int. Cl.
*G06F 11/30* (2006.01)
*G06F 11/34* (2006.01)
*G06F 9/451* (2018.01)
*H04L 67/303* (2022.01)
*H04W 8/22* (2009.01)

(52) U.S. Cl.
CPC ......... *G06F 11/3409* (2013.01); *G06F 9/453* (2018.02); *G06F 11/3051* (2013.01); *G06F 11/3055* (2013.01); *H04L 67/303* (2013.01); *H04W 8/22* (2013.01)

(58) Field of Classification Search
None
See application file for complete search history.

(56) References Cited

U.S. PATENT DOCUMENTS 7,813,715 B2 10/2010 McKillop
7,895,177 B2 2/2011 Wu
(Continued)

OTHER PUBLICATIONS

"Apple iPhone 7", T Mobile, © 2002-2019 T-Mobile USA, Inc., 8 pps., <https://www.t-mobile.com/cell-phone/apple-iphone-7>.

(Continued)

*Primary Examiner* — Idriss N Alrobaye
*Assistant Examiner* — Dayton Lewis-Taylor
(74) *Attorney, Agent, or Firm* — David K. Mattheis; Maeve Carpenter

(57) ABSTRACT

In an approach to determine performance information of a target item operating under a particular set of context information, a method, in response to receiving a request for performance information of a target item, and operating with a first computing device, identifies context information of the first computing device. The method determines whether a knowledge base includes a response that correlates to the request for performance information of the target item operating within context information similar to the first computing device. The method, in response to determining that the knowledge base includes the response that correlates to the request for performance information of the target item, sends the performance information to the first computing device, and initiates a communication channel between the first computing device and a second computing device operating the target item and having similar context information of the first computing device.

20 Claims, 4 Drawing Sheets

(56) References Cited

U.S. PATENT DOCUMENTS

| | | | |
|---|---|---|---|
| 8,407,671 | B2 | 3/2013 | Ananny |
| 8,588,763 | B2 | 11/2013 | Venkataraman |
| 8,626,545 | B2 | 1/2014 | Van Pelt |
| 8,806,644 | B1 | 8/2014 | McCorkendale |
| 8,848,899 | B2 | 9/2014 | Brunet |
| 9,003,017 | B2 | 4/2015 | Gerber |
| 9,053,135 | B2 | 6/2015 | Curry |
| 9,237,465 | B1 | 1/2016 | Tanner |
| 9,367,680 | B2 | 6/2016 | Mahaffey |
| 2004/0088314 | A1* | 5/2004 | Simes ................. G06F 11/3409 |
| 2008/0175372 | A1 | 7/2008 | Brunet |
| 2008/0301112 | A1 | 12/2008 | Wu |
| 2009/0061483 | A1 | 3/2009 | Clarkson |
| 2009/0111459 | A1 | 4/2009 | Topaltzas |
| 2009/0124250 | A1 | 5/2009 | Topaltzas |
| 2009/0157674 | A1 | 6/2009 | Curry |
| 2011/0047594 | A1 | 2/2011 | Mahaffey |
| 2011/0078108 | A1* | 3/2011 | Kumar ................ G06F 16/2471 707/602 |
| 2011/0135104 | A1 | 6/2011 | Bengtsson |
| 2011/0295846 | A1* | 12/2011 | Priyadarshan ..... G06Q 30/0202 707/723 |
| 2012/0265573 | A1 | 10/2012 | Van Pelt |
| 2013/0007255 | A1 | 1/2013 | Gerber |
| 2013/0072126 | A1 | 3/2013 | Topaltzas |
| 2013/0084882 | A1 | 4/2013 | Khorashadi |
| 2013/0254880 | A1 | 9/2013 | Alperovitch |
| 2014/0047417 | A1 | 2/2014 | Kaasila |
| 2014/0141726 | A1 | 5/2014 | Schlub |
| 2014/0235179 | A1 | 8/2014 | George |
| 2015/0025818 | A1 | 1/2015 | Das |
| 2015/0319071 | A1 | 11/2015 | Kaasila |
| 2015/0363289 | A1 | 12/2015 | Brough |
| 2017/0026486 | A1 | 1/2017 | Tran |
| 2019/0044882 | A1* | 2/2019 | Poorchandran ......... H04L 47/20 |

OTHER PUBLICATIONS

"Oticon ON", Updated Feb. 22, 2019, Google Play, 3 pps., <https://play.google.com/store/apps/details?id=com.oticon.remotecontrol&hl=en>.

"Oticon Opn Hearing Aids", Hearingtracker.com, printed from the Internet on Mar. 11, 2019, 88 pps., <https://www.hearingtracker.com/hearing-aids/oticon-opn#form-factor-263>.

Kamble et al., "Computing Product Rating Using Real-Time Feedback Comments from E-Commerce Portal", International Journal of Scientific & Engineering Research, vol. 6, Issue 11, Nov. 2015, 3 pps., < https://www.jser.org/researchpaper/Computing-Product-Rating-Using-Real-Time-Feedback-Comments-from-E-Commerce-Portal.pdf>.

Miller, "Back to Samsung from the Apple iPhone for one reason: signal strength", ZD Net, Smartphones and Cell Phones, Jun. 17, 2017, 6 pps., <https://www.zdnet.com/article/back-to-samsung-from-the-apple-iphone-for-one-reason-signal-strength/>.

* cited by examiner

ASSISTED SMART DEVICE CONTEXT PERFORMANCE INFORMATION RETRIEVAL

BACKGROUND OF THE INVENTION

The present invention relates generally to the field of smart device performance, and more particularly to determining performance of applications and connected components to a smart device operating under a particular context.

Products employing wired or wireless technologies have become significantly more consumer-friendly, affordable, and in many cases, compatible. It is often common for consumers to use multiple wired or wireless devices connected to their smartphones or smart devices. The connected devices may include, but are not limited to other smartphones, wireless headsets, ear buds, smart watches, hearing aids, smart glasses, and automotive integration. The devices are generally marketed as compatible with each other via standard communication protocols, and often include functional or performance claims, such as easy setup, extended range, smartphone control, low power consumption, and universal compatibility.

Prior to purchase, consumers often perform online research on a particular target device of interest, reviewing available product information and reviews from other users. Naturally, consumers tend to consider and purchase devices with favorable reviews, avoid devices with unfavorable reviews, and search for performance information of matching context.

SUMMARY

Embodiments of the present invention disclose a method, a computer program product, and a system for determining performance information of a target item operating in a particular context of a computing device. The method including one or more processors that in response to receiving a request for performance information of a target item having a target item profile, and operating with a first computing device, identify context information of the first computing device. The one or more processors determine whether a knowledge base includes a response that correlates to the request for performance information of the target item operating within context information similar to the first computing device. The one or more processors, in response to determining that the knowledge base includes the response that correlates to the request for performance information of the target item, send the performance information to the first computing device, and initiate a communication channel between the first computing device and a second computing device operating the target item and having context information that is similar to that of the first computing.

DETAILED DESCRIPTION

Figure 1:
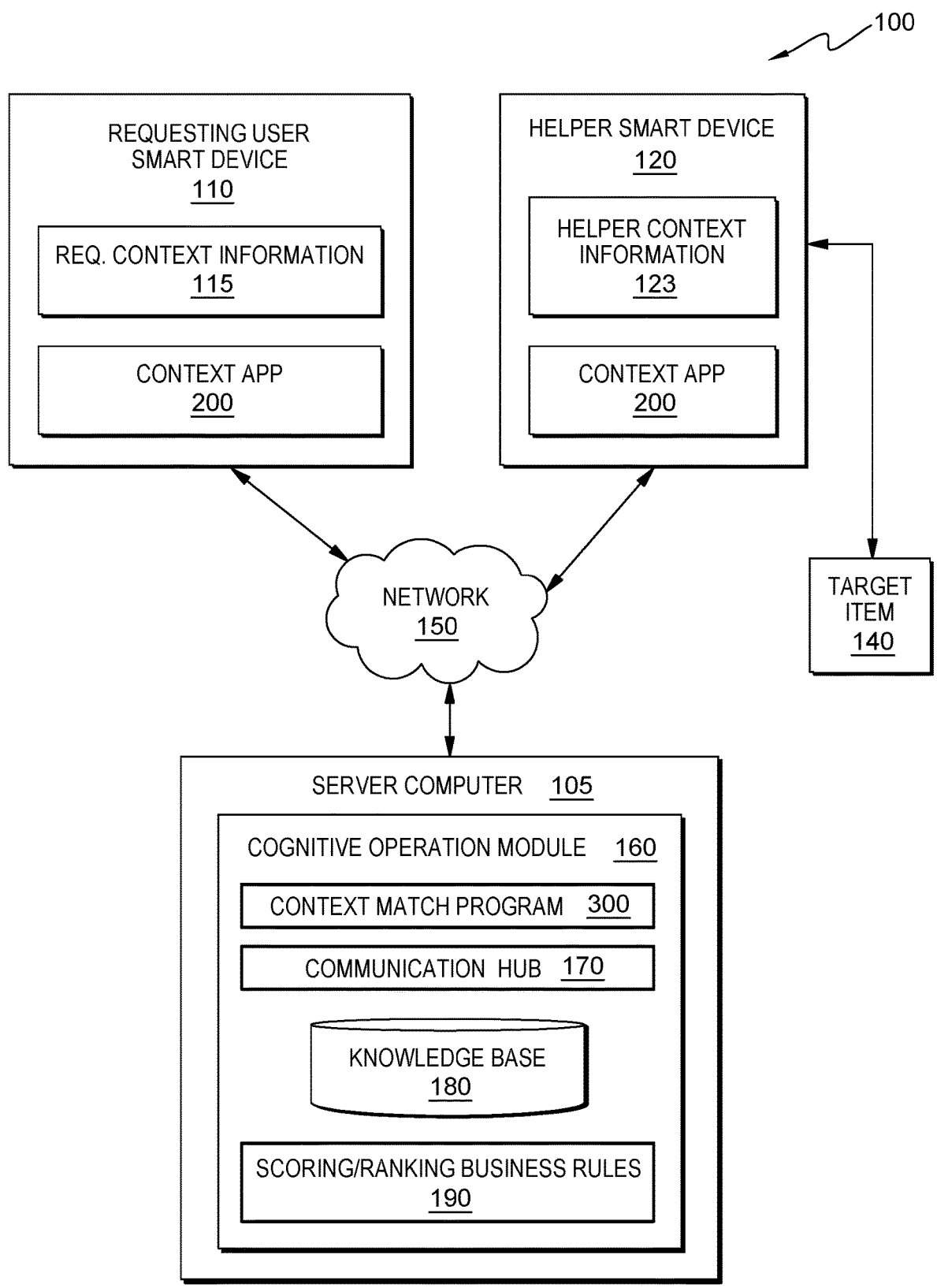
FIG. 1 is a functional block diagram illustrating a distributed data processing environment, in accordance with an embodiment of the present invention.

Embodiments of the present invention recognize the availability of a multitude of technology-enabled devices and apps, which connect with, or operate on smart devices, such as smartphones, smart tablets, smart televisions, or other computer-enabled electronic devices. Although customer reviews of technology-enabled devices and apps are often available, actual performance of a target device of interest in combination with a user's particular smart device may differ from advertised and review-reported results, without including knowledge of the particular context of the smart device operating with the target device, or target application. The context considerations, which may include such aspects as hardware models, software versions, firmware versions, configuration, location, distance, concurrent running applications (apps), may result in performance that differs significantly from advertised assertions, or by reviewer reports. Embodiments of the present invention further recognize the asserted compatibility, connectivity, and performance information provided by manufacturers and retailers often apply to a limited set of attributes and conditions of smart devices. However, the actual performance of an item to be used in combination with, or operated on a smart device, may vary greatly depending on the context of the smart device. The set of attributes and conditions of a smart device are referred to, herein, as a context (context information) of the smart device and may include specific details associated with a particular user's smart device. For brevity, the term "performance" as applied to a targeted item to be used with a smart device, as used herein, includes aspects of connectivity, compatibility, quality of display, quality of sound, speed of execution, battery life, and ease of use, among other performance and qualitative metrics.

For exemplary purposes, a non-exhaustive list of context information elements may include combinations of: device model, device version, device processor, device operating system (OS), OS version, firmware version, memory type, memory capacity, storage capacity, installed applications, concurrent running applications, GPS functions, camera functions, connected devices, integrated features, battery capacity, battery condition, network connections, location of smart device, altitude of smart device, and ambient temperature. Combinations of context items of a user's smart device are referred to in aggregate, herein, as "context", or "context information". Product reviews of target items posted by users may include satisfaction levels and some comments, but rarely include performance information experienced for a target item operating with a smart device having a specific context.

Due to the absence of context specific performance information of a target item, consumers often rely on the practice of "buy—test—return" in order to determine if the intended item of interest, referred to, herein, as a "target item", performs as expected with the individual's smart device having a particular set of context information. Target items may include an application (app) that is downloaded an operates on a smart device, a hardware item that is connected physically or wirelessly to a smart device, and a combination of hardware and enabling software. The requesting user creates a target item profile, which may include hardware, software, and environmental aspects the requesting user is interested in matching. In some embodiments, the target item may be a replacement smart device with the interest of whether previously purchased apps and devices perform acceptably with the new smart device.

The practice of "buy—test—return" to determine whether the target item performs as stated, presents the consumer with the undesirable approach of purchasing a target item of interest, and testing the performance of the target item with the consumer's smart device context in order to determine whether the performance meets expected and acceptable levels. The approach often requires the consumer to return the item, which adds inconvenience, loss of time, and additional cost, and the consumer must search further for a potential alternate target item that performs better with respect to the consumer's smart device and its corresponding set of context information. Manufacturers and retailers are also faced with a burden of handing target item returns that may be otherwise avoidable, or exploring extensive experimentation on a wide range of make, model, operating systems, concurrent apps, and other context information of smart device and target item products to determine effects on connectivity, compatibility, and function.

Embodiments of the present invention provide performance information of a target item in combination with a particular set of context information of a smart device of a requesting user. The performance information is based on collected performance experience of the target item operating on a smart device of a helper-user (hereafter 'helper'), which has a similar set of context information as the requesting user. In some embodiments, the performance information may include unstructured response information from a helper, providing qualitative or otherwise unmeasured information.

Embodiments of the present invention identify context information associated with a participating user's smart device and store the combination of smart device and context information in a knowledge base. The context information includes context elements of the smart device, and the devices and applications installed and/or connected to the smart device that may serve as target item requests from other users. In some embodiments, measurable performance information is also collected from smart devices operating various apps and connected devices, which may be considered as target items by other users, and the measurable performance information is stored associated with the corresponding context of the smart device, in a knowledge base. A request for performance information by a user considering a particular target item, is directed to a search of the knowledge base to determine whether a match of a smart device of similar context operating the particular target item is found.

Some embodiments of the present invention determine the degree of similarity between the context of the requesting user's smart device and the context of a smart device found in the knowledge base by a scoring or ranking activity, aided by applying additional business rules. The scoring or ranking of smart device context information, stored in the knowledge base, may reflect a percentage of matching context elements, with higher priority context information elements weighted greater than lower priority context information elements. In other embodiments, a scoring system using points associated with elements of the context information of the requesting user's smart device, may be used, with the user-designated more important elements weighted with more points that elements that are designated less important to the requesting user. In some embodiments, business rules may include additional filtering criteria specified by the requesting user or a helper. Additional embodiments of the present invention apply a predetermined threshold of scoring or ranking to filter potential helpers, and the requesting user may receive a notification identifying participating helpers having similar smart device—target item context. In some embodiments the notification may include connection to an individual helper. In other embodiments, the notification may present connections to each of multiple, ranked helpers, based on context similarity scoring or ranking.

In some embodiments of the present invention, a requesting user specifies business rules to prioritize certain elements of the context information, or include additional filtering indicated by the requesting user or the helper. Requesting users may designate elements of the context information associated with the requesting user's smart device as higher priority elements and weight the higher priority elements greater in ranking and scoring for similarity determination. Smart devices found in the knowledge base having more high priority context elements in common with the requesting user's smart device, score or rank higher than smart devices having fewer high priority context elements.

Embodiments of the present invention provide an anonymous secure connection between a helper responding with "opt-in" and having a highest ranking or scoring of context similarity, and the requesting user. If a highest ranking or scoring helper does not indicate an "opt-in" response to participating, a next-highest ranking or scoring helper is identified and presented with an "opt-in" option. Connections are made between smart devices, based on the context information similarity, without collection of personal identity or personal information. The helper is presented a notification to accept or decline an option-in (opt-in) to participate and respond to a requesting user, regarding performance of the target item operating with some or all of similar smart device context information. Confirming the participation of the helper, the requesting user receives a notification and the connection is made. In some embodiments, the connection between the requesting-user and the helper enables transmission of feedback that may be manual or automatic.

For example, manual feedback enables a helper to provide responses to a requesting user's specific questions, such as performance regarding a target item operating on the helper's smartphone under specific context. In some embodiments, measurable performance information from the helper's smart device under similar context to that of the requesting user's smart device, is automatically sent to the requesting user's smart device, in response to the opt-in response from the helper's smart device receiving the request. In other embodiments, the requesting user may initiate specific questions to the helper, which may include requests for subjective or qualitative input from the helper, such as the perceived quality of display, sound, or comfort. Implementation of embodiments of the invention may take a variety of forms, and exemplary implementation details are discussed subsequently with reference to the Figures.

The present invention will now be described in detail with reference to the Figures. FIG. 1 is a functional block diagram illustrating a distributed data processing environment, generally designated 100, in accordance with an embodiment of the present invention. The term "distributed" as used in this specification describes a computer system that includes multiple, physically distinct devices that operate together as a connected computer system. FIG. 1 provides only an illustration of one implementation and does not imply any limitations regarding the environments in which different embodiments may be implemented. Many modifications to the depicted environment may be made by those skilled in the art without departing from the scope of the invention as recited by the claims.

Distributed data processing environment 100 includes requesting user smart device 110, helper smart device 120, target item 140 and server computer 105 depicted as including cognitive operation module 160, all interconnected via network 150.

Network 150 can be, for example, a local area network (LAN), a telecommunications network, a wide area network (WAN), such as the Internet, a virtual local area network (VLAN), or any combination that can include wired, wireless, or optical connections. Network 150 can include one or more wired and/or wireless networks that are capable of receiving and transmitting data, voice, and/or video signals, including multimedia signals that include voice, data, and video information. In general, network 150 can be any combination of connections and protocols that will support communications between requesting user smart device 110, helper smart device 120 and server computer 105, in accordance with embodiments of the present invention.

Requesting user smart device 110 is an electronic computing device capable of receiving and executing programmable instructions. Requesting user smart device 110 is depicted as including Requestor context information 115, which includes specific context elements associated with requesting user smart device 110, such as device model, device version, device processor, device operating system (OS), OS version, firmware version, memory type, memory capacity, storage capacity, installed applications, concurrent running applications, GPS functions, camera functions, connected devices, integrated features, battery capacity, battery condition, network connections, location of smart device, altitude of smart device, and ambient temperature, among other context information elements. In some embodiments, requesting user smart device 110 can be a smart phone, a tablet, a laptop computer, a personal data assistant (PDA), a smart watch, a smart TV or any electronic computing device capable of executing machine readable program instructions and communicating with other computing devices within distributed data processing environment 100 via a network, such as network 150. Requesting user smart device 110 may include internal and external hardware components, as depicted and described in FIG. 4.

Requesting user smart device 110 is illustrated as including context app 200, which is an application downloaded by the user onto requesting user smart device 110, which collects requestor context information 115 associated with requesting user smart device 110 and information associated with added devices and applications operating on, or connected to, requesting user smart device 110. Context app 200 receives user permission to collect requestor context information 115 and notifies context match program 300 (FIG. 1) to receive requestor context information 115. In some embodiments, downloading context app 200 solicits and confirms user approval to collect requestor context information 115 of the host smart device, and make requestor context information 115 available to context match program 300. Context app 200 omits personal identity and personal information associated with requesting user smart device 110.

In some embodiments of the present invention, context app 200 sends the collected requestor context information 115 specifically associated with requesting user smart device 110 to context match program 300 for Natural Language Processing techniques and storage of a resulting set of context criteria in knowledge base 180, depicted as part of cognitive operation module 160 (FIG. 1). In some embodiments, context app 200 enables the user of requesting user smart device 110 to initiate a request to determine the performance of a particular target item associated with a smart device with similar context information to that of requesting user smart device 110. In some embodiments of the present invention, context app 200 presents the user of requesting user smart device 110 with a permission request, which requires approval to allow context match program 300 to access and obtain context information from requesting user smart device 110.

Helper smart device 120 is an electronic computing device capable of receiving and executing programmable instructions. Helper smart device 120 is depicted as including helper context information 123 specific to helper smart device 120, which includes context elements such as the smart device model, version, processor type and speed, operating system, and other attributes similar to those described for requesting user smart device 110. Helper context information 123 of helper smart device 120 includes target item information (not shown) for target item 140, depicted as connected to helper smart device 120. The aggregate target item information of helper smart device 120 includes the specific context and performance information associated with target item 140, as well the context and performance information of other target items previously added (not shown) to helper smart device 120. In some embodiments, helper smart device 120 can be a smart phone, a tablet, a laptop computer, a personal data assistant (PDA), a smart watch, a smart TV or any electronic computing device capable of executing machine readable program instructions and communicating with other computing devices within distributed data processing environment 100 via a network, such as network 150. Helper smart device 120 may include internal and external hardware components, as depicted and described in FIG. 4.

Helper smart device 120 is depicted as including context app 200, which is a program downloaded on helper smart device 120, that collects context information associated with helper smart device 120 and information associated with added devices and applications operating on, or connected to, helper smart device 120. Context app 200 receives user permission to collect context information and notifies context match program 300 to receive the context information. In some embodiments, downloading context app 200 includes user approval to have context information of the host smart device collected and made available to context match program 300. Context app 200 omits personal identity and personal information associated with helper smart device 120.

In some embodiments of the present invention, context app 200 sends the collected context information specifically associated with helper smart device 120 to context match program 300 for Natural Language Processing techniques and storage of a resulting set of context criteria in knowledge base 180, depicted as part of cognitive operations module 160. In some embodiments, context app 200 enables the user of helper smart device 120 to initiate a request to determine the performance of a particular target item associated with a smart device with similar context information to that of requesting user smart device 110. In some embodiments of the present invention, context app 200 presents the user of requesting user smart device 110 with a permission request, which requires approval to allow context match program 300 to access and obtain context information from requesting user smart device 110

Server computer 105 is depicted as including cognitive operation module 160, which includes context match program 300, communication hub 170, knowledge base 180 and scoring/ranking business rules 190, operating within distributed data processing environment 100, in accordance with embodiments of the present invention. Server computer 105 can be a standalone computing device, a management server, a web server, a mobile computing device, or any other electronic device or computing system capable of providing receiving, sending, and data processing server functions. In other embodiments, server computer 105 can represent a server computing system utilizing multiple computers as a server system, such as in a cloud computing environment. In another embodiment, server computer 105 can be a laptop computer, a tablet computer, a netbook computer, a personal computer (PC), a desktop computer, a personal digital assistant (PDA), a smart phone, or any other programmable electronic device capable of communicating with requesting user smart device 110, helper smart device 120, and other computing devices (not shown) within distributed data processing environment 100, via network 150. In another embodiment, server computer 105 represents a computing system utilizing clustered computers and components (e.g., database server computers, application server computers, etc.) that act as a single pool of seamless resources when accessed within distributed data processing environment 100. Server computer 105 may include internal and external hardware components, as depicted and described in further detail with respect to FIG. 4.

Cognitive operation module 160 is illustrated as including context match program 300, communication hub 170, knowledge base 180 and scoring/ranking business rules 190. Communication hub 170 receives user smart device context information and user target item requests and processes the target item request to generate a set of criteria that can be used for matching and filtering context elements, for example, by applying Natural Language Processing techniques. The set of criteria from a processed request is sent to context match program 300 for ranking by scoring/ranking business rules 190 and search for matching context within knowledge base 180.

In some embodiments of the present invention, communication hub 170 initiates a connection notification between requesting user smart device 110 and helper smart device 120, in response to identifying a similar match of smart device context and target item information in knowledge base 180. Communication hub 170 sends a notification to the smart device of a helper determined to have a similarity score or ranking that exceeds a predetermined threshold to respond to an agreement (opt-in) to act as a helper to the requesting user's request. The notification asks the helper to indicate whether they "opt-in", agreeing to participate as a helper for the particular request of the requesting user. In response to the helper providing an "opt-in" agreement to participate and respond to the requesting user's request, communication hub 170, in conjunction with context match program 300, initiates a secure and anonymous connection between the requesting user's smart device and the participating helper's smart device, enabling communication regarding the particular request, and potential follow-up or clarifying questions and responses. Communication hub 170 receives the communication transmissions from the requesting user and helper and re-transmits the communications to their respective recipients to maintain anonymity and, in addition, provides context match program 300 with copies of communication transmissions to process and store with the context and requested information in knowledge base 180.

Knowledge base 180 is a repository of multiple smart devices and respective context information as obtained by context match program 300 connected to a participating smart device. In some embodiments, the context information of a smart device is collected through a connection with context match program 300, enabled by context app 200 downloaded on the particular smart device and receiving participation permission by the device's user. Context app 200 automatically captures the environment and settings of the host smart device to create a current device profile, which is captured in context information of the smart device. In some embodiments, a user of the smart device is invited by the app to contribute additional uncaptured context information, which may include qualitative assessments and other unmeasured performance information. Knowledge base 180 receives the context information of the current device profile and stores the combination of context information and smart device.

In some embodiments, knowledge base 180 receives communication exchanges from communication hub 170, between a requesting user and a participating helper regarding a particular target item request associated with a particular context. Knowledge base 180 stores and associates the communications with the particular smart device context and target item of the requesting user's request, making the communications available for subsequent search and similarity match activities. In some embodiments, the communications are processed by Natural Language Processing techniques to generate a set of criteria from the communications, more suitable for similarity searches.

Scoring/Ranking business rules 190 is a function module of context match program 300 that determines a measure of similarity between the requesting user's smart device context and target item information (target item profile), and helper smart device context and target items stored in knowledge base 180. Scoring/ranking business rules 190 generates a level of similarity by determining similar elements between the context of requesting user smart device 110 context information, and the context information found in stored entries of knowledge base 180. In some embodiments of the present invention, the similarity is expressed as a score, with matching context elements assigned points, and an aggregate of points indicating the level of similarity. In other embodiments the similarity is presented as a ranking, which may be based on a percentage of matching elements of context, or other comparative schemes. Business rules may be included by requesting user smart device 110's user and helper smart device 120's user, to provide additional filtering. In some embodiments, business rules are used to prioritize certain elements of context as more important than other elements, giving additional weight to the priority elements. Requesting users are offered the opportunity to designate priority elements of the smart device context and target item profile when submitting a request. In some embodiments the prioritization of elements may be a ranking from most important to least important, whereas in other embodiments, an element may be designated by degree as more important than another element of the context, such as battery life of a target item may be three times more important than wireless connection range.

Context match program 300 is illustrated as operating on server computer 105, in conjunction with cognitive operation module 160. In embodiments of the present invention, context match program 300 accesses user smart devices, such as requesting user smart device 110 and helper smart device 120, and receives context information corresponding to the respective smart device, connected devices, and application operating on the smart device. As discussed above, the context information of a smart device serves as a current device profile, and captures the contextual information or environment of the smart device which includes, but is not limited to: device model, device version, device processor, device operating system (OS), OS version, firmware version, memory type, memory capacity, storage capacity, installed applications, concurrent running applications, GPS functions, camera functions, connected devices, integrated features, battery capacity, battery condition, network connections, location of smart device, altitude of smart device, and ambient temperature. Context match program 300 processes the received context information and applies Natural Language Processing techniques to generate a set of criteria suitable for performing searches, searches for a similar match of corresponding context elements, and stores the received and processed context information in knowledge base 180.

In some embodiments of the present invention, context match program 300 may operate in conjunction with a mobile app (not shown) downloaded on the smart device, which initiates collection of the context information specifically associated with the particular smart device, as well as added devices connected to the smart device, applications installed on the smart device, and information regarding concurrently running applications. In some embodiments, the context information is aggregated by the mobile app and made available for context match program 300 to access and/or receive. In some embodiments of the present invention, installation of the mobile app includes user permission to collect and make the context information of the particular smart device available for storage in knowledge base 180 or used as part of a request for performance information of a specified target item by the smart device's user acting as a requesting user. Context match program 300 stores the context information associated with the particular smart device in knowledge base 180, without including personal identity or personal information of the user of the smart device.

Context match program 300 receives a request from a smart device of a requesting user requesting performance information of a target item operating under the context of the requesting user's smart device. In some embodiments, the target item may be a device, for example, a hearing aid wirelessly controlled and adjusted through the smart device. A device target item may also include software enabling its operation, control, or connectivity to the smart device of the requesting user. In some embodiments, the target item may be an application that is connected to and operated by the smart device. Context match program 300 receives the request from requesting user's smart device that includes the context information associated with the smart device, and the target profile information of target item 140. Context match program 300 searches the knowledge base for context information similar to the requesting user's smart device that includes performance information of the target item. In some embodiments the performance information may include measurements associated with the performance of the target item in a context similar to that of the requesting user's smart device. In other embodiments, the performance information may merely indicate the operation of the target item in a context similar to that of the requesting user's smart device.

In some embodiments of the present invention, context match program 300 determines a similarity of the context information of the requesting user's smart device, and the respective context of smart devices that include operation of the target item, stored in knowledge base 180. Context match program 300 uses business rules input by the requesting user, and applied by scoring/ranking business rules 190, to determine a scoring or ranking of context information of smart devices included in knowledge base 180 to locate a similar match of the smart device context of the requesting user. In some embodiments, context match program 300 determines the context information of the smart devices stored in knowledge base 180 having context information exceeding a predetermined threshold of similarity to the smart device context information of the requesting user. Context match program 300 responds to the requesting user's request providing similarly matched results from knowledge base 180.

In some embodiments, context match program 300, acting in parallel, identifies the smart device with similar context and operation of the target item, of a potential "helper." Context match program 300 generates a notification, processed through communication hub 170 to the smart device of the helper, inquiring whether the helper wishes to participate with the request and potential questions from the requesting user. The notification includes a choice for the helper to "opt-in" and agree to participate, or "opt-out", with no further communication for the immediate request. Context match program 300 receives, via communication hub 170, a reply from the helper smart device indicating the opt-in or opt-out decision. For the case in which the helper has replied opt-in, context match program 300 initiates a communication channel, via communication hub 170, between the smart device of the requesting user and the smart device of the helper, maintaining anonymity and establishing a secure connection. Context match program 300 collects communications between the requesting user and the helper regarding the request, processes the content via Natural Language Processing techniques, and stores the resulting information in knowledge base 180 associated with the particular context and target item request, for subsequent searches.

Figure 2:
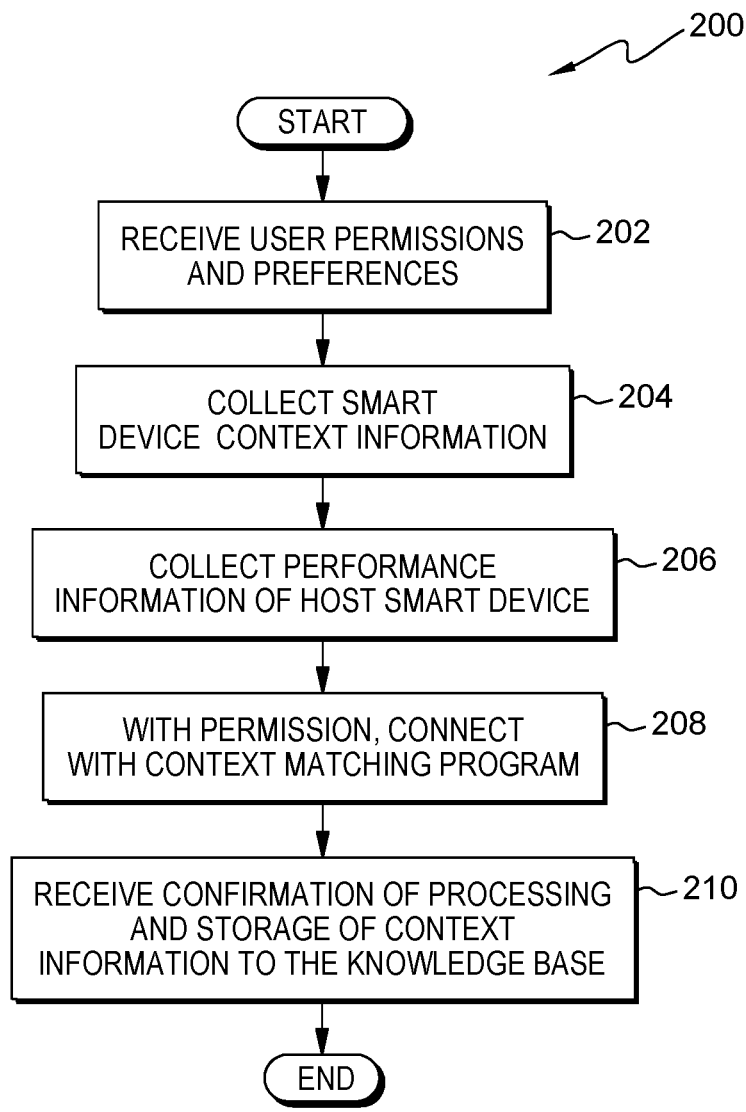
FIG. 2 illustrates operational steps of a context application (app) operating on a smart device within the distributed data processing environment of FIG. 1, in accordance with an embodiment of the present invention.

FIG. 2 illustrates operational steps of context app 200 operating requesting user smart device 110 and helper smart device 120, within distributed data processing environment 100 of FIG. 1, in accordance with an embodiment of the present invention. In an exemplary embodiment, context app 200 is downloaded onto requesting user smart device 110 and helper smart device 120 by the devices' respective users. In some embodiments, context app 200 may be accessed in an app store, or by accessing a link to a download website.

Context app 200 receives user preferences and permissions from a smart device (step 202). In some embodiments, permission to perform context information collection and store the context information in the knowledge base is granted by the confirmation of the user of the smart device to download context app 200. In other embodiments, context app 200 may directly present a request for approval to collect and store context information to the user of the host smart device.

Having received permission, context app 200 collects the context information of the smart device (step 204). A scan of the smart device is performed to determine the context elements associated with the smart device. The context information is collected by context app 200, and includes, but is not limited to: smart device manufacturer, type, version, settings, OS, applications, battery condition, and connected devices. In some embodiments, context app 200 includes the collected context information in a profile formatted for use by context match program 300. For example, context app 200 collects and aggregates context information of requesting user smart device 110 and includes the information in a file accessible to context match program 300. In other embodiments, subsequent to collecting context information of helper smart device 120, context app 200 sends the context information to context match program 300, via communication hub 170.

Context app 200 collects the performance information associated with the smart device (step 206). Performance information of the smart device's operations and performance information of connected devices and/or applications are collected by context app 200. For example, helper smart device 120 context information includes battery level performance information during operation of connected wireless hearing aid devices.

Subsequent to confirming receipt of permission, context app 200 connects with context match program 300 (step 208). A check is made confirming the receipt of permission from the user of the smart device to collect context information and make the information available for subsequent similarity matching, or as part of a performance information request of a target item. In some embodiments, context app 200 confirms that personal identification or personal information residing on the smart device, is not included in the collection of context information. For example, context app 200 displays a notification on requesting user smart device 110, requesting user authorization for context app 200 to collect context information and make the information available to context match program 300, operating on server 105, via network 150.

Context app 200 receives confirmation of processing and storage of the collected context information to the knowledge base (step 210). In some embodiments of the present invention, context app 200 communicates with context match program 300 via network 150 and communication hub 170 and transmits the collected context information of the smart device. In some embodiments, the collected context information includes performance information of devices connected to the smart device, applications running on the smart device, and operational performance measurements, such as battery degradation of the smart device under certain operating conditions. In other embodiments, context app 200 communicates with context match program 300 to access and receive the collected context information, via network 150 and communication hub 170. Context match program 300 performs Natural Language Processing (NLP) techniques to extract a set of criteria corresponding to the context information of the smart device and stores the set of criteria as context information in knowledge base 180. Context app 200 receives a confirmation from context match program 300 confirming the receipt, processing, and storage of the context information, and context app 200 ends.

Figure 3:
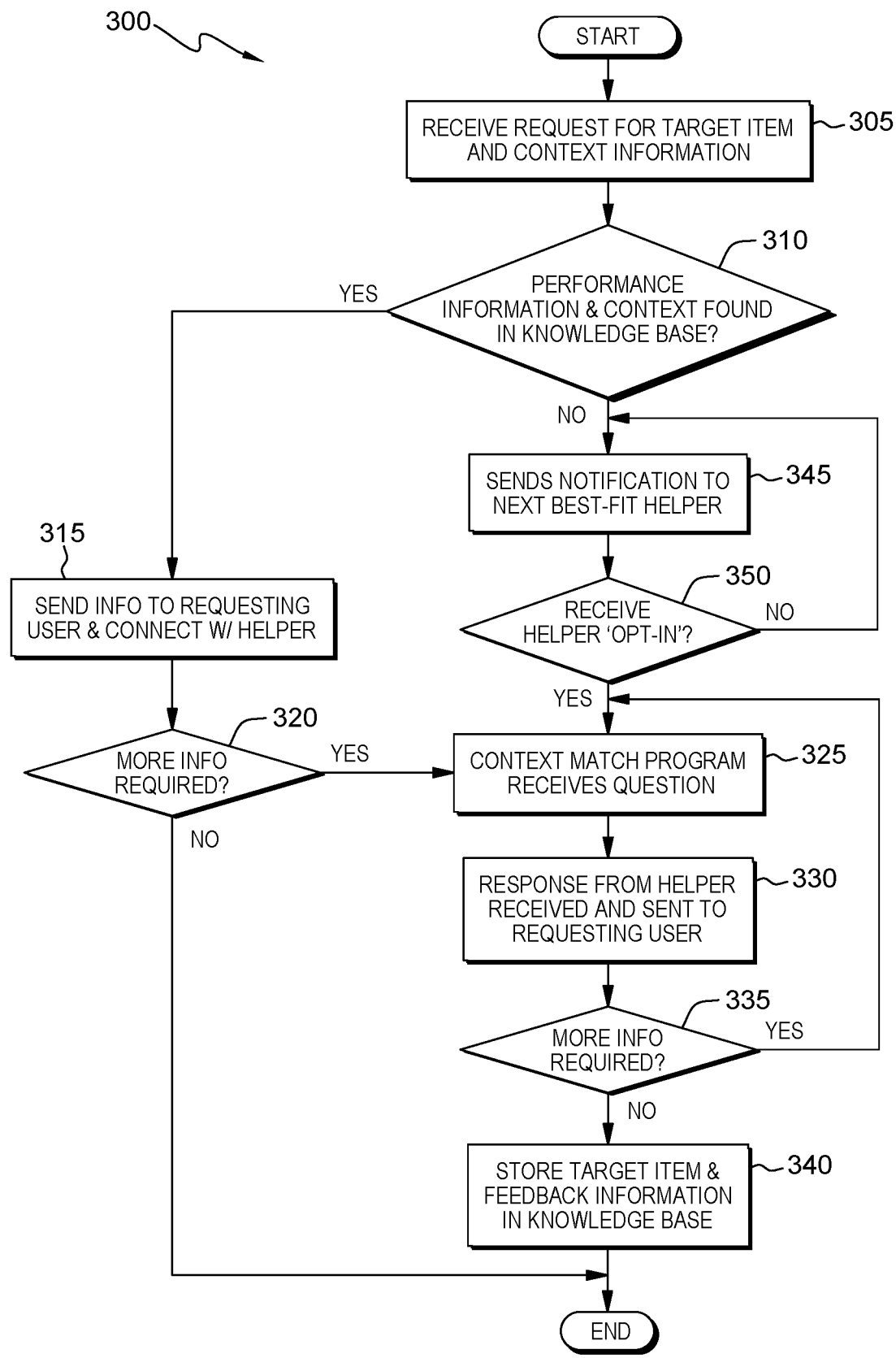
FIG. 3 illustrates operational steps of a context match program, inserted on a server within the distributed data processing environment of FIG. 1, in accordance with an embodiment of the present invention.

FIG. 3 illustrates operational steps of context match program 300, operating on server 105 within distributed data processing environment 100 of FIG. 1, in accordance with an embodiment of the present invention.

In step 305, context match program 300 receives a request for performance information of a target item operating under particular context information from a requesting user. The requesting user submits a request to search for a similar match of context information of a smart device operating the particular target item requested. The request seeks performance information regarding the operation of the target item under the similar context of the requesting user's smart device. For example, the user of requesting user smart device 110 uses context app 200 to submit a request received by context match program 300, via network 150 and communication hub 170. In some embodiments of the present invention, the request includes the context information of requesting user smart device 110. In other embodiments, the request identifies requesting user smart device 110 (but not the personal or identifying information of the user of the requesting smart device) to enable search for the corresponding context information stored in knowledge base 180. The request received by context match program 300 also includes a profile of information associated with the target item, such as target item 140.

An operational example of context match program 300 considers a requesting user having a smart device (requesting user smart device 110), and context information of the smart device collected and submitted for storage in knowledge base 180. The requesting user submits a request, for example, via context app 200, to context match program 300 requesting performance information on a particular brand of hearing aids (target item 140) that operates and is controlled wirelessly by a smart device with context information similar to that of requesting user smart device 110. For example, the requesting user is interested in certain performance information of the hearing aids in the context of requesting user smart device 110. In particular the requesting user is interested in battery life drain of the smart device, the clarity of sound with multiple concurrent applications running on the smart device, and how comfortable the hearing aids feel when worn.

Context match program 300 determines whether a performance information match is found in knowledge base 180 (decision step 310). Context match program 300 searches knowledge base 180 for a helper smart device having performance information of the target item operating under smart device context information similar to that of requesting user smart device 110. In some embodiments of the present invention, context match program 300 processes the requesting user smart device context information utilizing Natural Language Processing techniques to generate a set of criteria of the context information. The set of criteria of the context information enables a correlation, or a similarity determination, matching of stored context information in knowledge base 180. In some embodiments, the context information of the requesting user's smart device includes business rules included by the requesting user, to prioritize elements of the requesting user's smart device context information. For example, the requesting user may prioritize battery life, and concurrent running applications on the smart device. Context match program 300 applies the business rules and scoring/ranking techniques to the requesting user's smart device context information.

For the case in which context match program 300 determines a similar match of context information operating the target item is found in knowledge base 180 (step 310 "YES" branch), context match program 300 sends performance information associated with the target item operating on a smart device with similar context information, to the requesting user and connect with a helper (step 315). The requesting user receives the available performance information and applies the information to decisions directed to the use of the target item with the requesting user smart device. Context match program 300 also identifies a smart device with similar context information and sends a notification to the helper smart device regarding possible questions a requesting user may have about the use of the target item in the context of the helper's smart device.

In some embodiments of the present invention, context match program 300 displays a choice on the helper smart device as to whether the helper wishes to "opt-in" and respond to the requesting user's question, or decline. In other embodiments, the helper has previously agreed to participate in responding to requesting user's questions when the context information of the current device profile of helper smart device 120 was collected and added to knowledge base 180. For example, context match program 300 identifies helper smart device 120 as having similar context information (from knowledge base 180) and having performance information associated with the particular brand of hearing aids of the request. Context match program 300 sends the performance information of helper smart device 120 to requesting user smart device 110. In some embodiments, context match program 300 may send a notification to helper smart device 120 indicating the requestor may have questions regarding the performance of the target device, and request whether the helper wishes to "opt-in".

Context match program determines whether the requesting user requires additional information (decision step 320). In some embodiments, in response to sending the requested performance information, context match program may inquire whether the requesting user has additional questions. For the case in which the requesting user responds that more information is required (step 320, "YES" branch), the requesting user submits at least one question, which is received by context match program 300 (step 325). In the interest of brevity, the sending and receiving by context match program 300, described herein, utilizes communication hub 170 and network 150 (FIG. 1), however, each instance of sending or receiving may not repeatedly recite such details. Context match program 300 sends the received question to the helper's smart device and maintains anonymity of the helper and the requesting user. In some embodiments context match program 300 establishes a secure connection between the requesting user and the helper.

For example, context match program 300 receives a question from requesting user smart device 110 regarding the sound clarity of the hearing aid devices while multiple applications are running concurrently on the smart device controlling the hearing aids. Context match program 300 relays the question to helper smart device 120 and maintains anonymity of the respective users. Qualitative performance may typically require a response not adequately represented by performance metrics of the smart device, and embodiments of the present invention cover such performance interests by enabling communication of questions and responses between the smart devices of the requesting user and the helper, while maintaining an anonymous and secure connection between participating parties.

Context mapping program 300 receives a response to the question from the helper's smart device and relays the response to the requesting user's smart device (step 330). For example, the user of helper smart device 120 submits a response to the questions received from requesting user smart device 110 describing sound clarity in quiet and noisy surroundings while two applications are concurrently running on the smart device. The user of helper smart device 120 also describes the hearing aids as very comfortable and well fitting, which could not be determined by the requesting user from the performance metrics extracted from knowledge base 180.

Context match program 300 determines whether more information is required (decision step 335). Context match program 300 checks the requesting user smart device to determine if more information is required. For the case in which context match program 300 determines that more information is required (step 335, "YES" branch), context match program 300 receives a question for the requesting user smart device, sends the question to helper smart device 120 (step 325), and continues as described above. For example, context match program 300 may receive an additional question from requesting user smart device 110 regarding the signal range experienced between the hearing aids and helper smart device 120 having similar context information. Context match program 300 sends the additional question to helper smart device 120.

For the case in which context match program 300 determines that no more information is required (step 335, "NO" branch), context match program 300 stores target item and question response information in the knowledge base, associated with the requesting user smart device context and target item request (step 340), and context matching program 300, ends.

Returning to decision step 320, for the case in which no more information is required from requesting user smart device 110 (step 320, "NO" branch), context match program 300 ends.

Returning to decision step 310, for the case in which context match program 300 does not find performance information operating under similar context of requesting user smart device 110 (step 310, "NO" branch), context match program 300 sends a notification to a next-best fit helper (step 345). Context match program 300 determines a helper smart device with context information most similar to the context information of requesting user smart device 110. In the notification, context match program 300 describes the request for performance information of a target item operating under similar context information. The notification may request approval from the helper to send performance information automatically from helper smart device 120, and approval by the helper to participate in responding to questions from the requesting user.

For example, requesting user smart device 110 sends a request to context match program 300 for performance information regarding a particular brand of hearing aid operated and controlled wirelessly from requesting user smart device 110 having its particular context information. Context match program 300 does not find matching performance information for the hearing aids in knowledge base 180. However, context match program 300 determines that helper smart device 120 has similar context information and sends a notification to helper smart device 120. In some embodiments, helper smart device 120 context information may indicate operation with the particular hearing aids, but no performance information has been stored in knowledge base 180. Context match program 300 sends a notification describing the request for performance information a target item operating under similar context information, and requests whether the user of helper smart device 120 wishes to participate by choosing to "opt-in".

Context match program 300 determines whether an agreement to opt-in is received from the user of the helper smart device (decision step 350). Determining that the user of helper smart device 120 agrees to opt-in (step 350, "YES" branch), context match program 300 connects with requesting user smart device 110, receives a question (step 325), and proceeds as discussed above. For example, context match program 300 receives a positive response to opt-in from helper smart device 120. Context match program 300 connects with requesting user smart device 110 to receive a question regarding the performance information associated with target item 140. Context match program 300 sends the question to helper smart device 120 via communication hub 170.

For the case in which helper smart device indicates the helper does not opt-in (step 350, "NO" branch), context match program 300 determines and sends a notification to a next best-fit helper (step 345) and proceeds as discussed above. For example, context match program 300 determines scoring or ranking as performed by scoring/ranking business rules 190 and based on the business rules establishing priority context elements, and subsequent scoring and/or ranking, context match program 300 determines a best-fit of similarity of helper context information 123 in knowledge base 180 to the context information and target item request from requesting smart device 110. In response to confirming the user of requesting user smart device 110 has no additional information requirements (step 335, "NO" branch), context match stores the question responses with the request for target item performance under context information similar to requesting user smart device 110, in knowledge base 180 (step 340), and program 300 ends.

In embodiments of the present invention in which context match program 300 presents multiple instances of helper smart device connections to the user of requesting user smart device 110, the requesting user may choose to work with a particular helper having a score, ranking or confidence level, as determined by scoring/ranking business rules 190, which exceeds a predetermined threshold. Connections established between requesting user smart device 110 and helper smart device 120 are enabled to directly communicate via context match program 300 and communication hub 170. In some embodiments, the requesting user may request the helper to perform particular testing function or additional context conditions and report performance results. In some embodiments, context match program 300 automatically collects context information and performance information from helper smart device 120, in response to an "opt-in" approval.

In some embodiments of the present invention, the user of requesting user smart device 110, having received performance information and/or responses to questions from a particular helper, may score or rank the communicated information from that helper indicating degrees in which the information is helpful or not helpful. In some embodiments, the score or ranking of received performance information and question responses by the requesting user is used to train and improve the similarity matching and ranking performed by context match program 300. Embodiments of the present invention maintain access of previous communication sessions of a requesting user with a participating helper for review or replay, by the requesting user and the helper(s).

Figure 4:
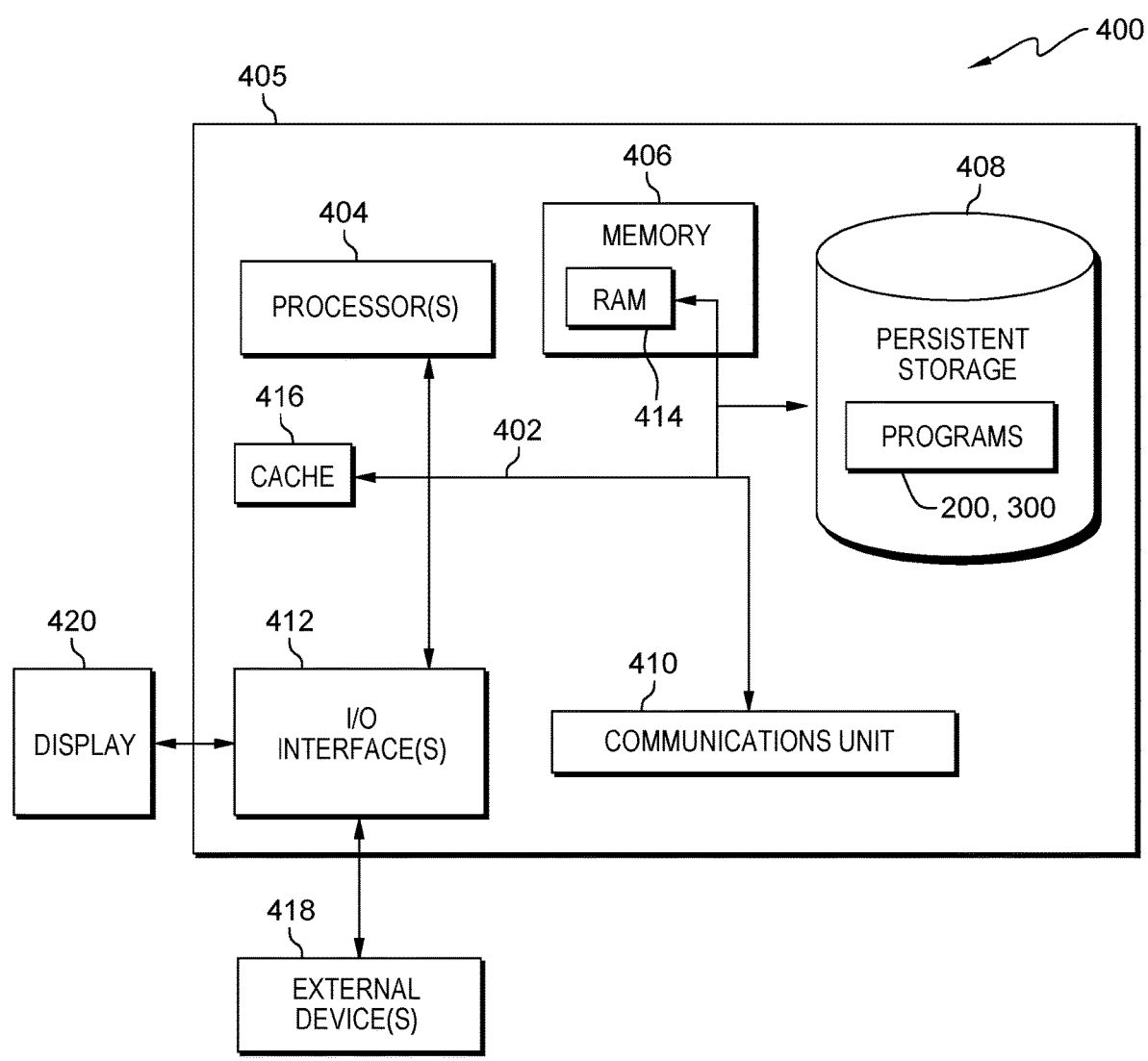
FIG. 4 depicts a block diagram of components of a smart device enabled to execute the context information module and target performance module within the distributed data processing environment of FIG. 1, in accordance with an embodiment of the present invention.

FIG. 4 depicts a block diagram of components of computer system 400, including computing device 405, within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing device 405 includes components and functional capability similar to server 105, requesting smart device 110, and helper smart device 120 (FIG. 1), in accordance with an illustrative embodiment of the present invention. Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

Context app 200 and context match program 300 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed data processing environment 100, such as requesting user smart device 110, helper smart device 120, and server 105. In these examples, communications unit 410 includes one or more network interface cards. Communications unit 410 may provide communications through the use of either or both physical and wireless communications links. Context app 200 and context match program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., context app 200 and context match program 300 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining performance information of a target item operating with a computing device, the method comprising:

receiving, by one or more processors, a request from a user of a first computing device for performance information about operation of a first target item under a context associated with the first computing device and a set of existing items associated with the first computing device, wherein the first target item includes a target item profile that includes input by the requesting user;

searching, by the one or more processors, for a response to the request in a knowledge base containing context specific performance information of target item operation associated with multiple computing devices;

identifying, by one or more processors, from the knowledge base, a response to the request for performance information of the first target item having the target item profile and operating with a second computing device under the context information similar to the first computing device and the set of existing items, wherein the response includes a ranking of most similar to the first target item and the context associated with the first computing device and the set of existing items;

sending, by the one or more processors, the response with the ranking most similar to the first target item and the context information of the first computing device with the set of existing items, including the performance information, and enabling a connection to the second computing device from the first computing device; and initiating, by one or more processors, a communication between the first computing device and a second computing device enabling sending of queries from the user of the first computing device to the user of the second computing device regarding the request for performance information of the first target item.

2. The method of claim 1, wherein initiating the communication channel between the first computing device and the second computing device further comprises:

one or more processors sending a message requesting participation by a user of the second computing device for communication with a user of the first computing device, regarding the target item; and in response to receiving an opt-in agreement to participate from the user of the second computing device, one or more processors establishing an anonymous communication channel between the first computing device and the second computing device.

3. The method of claim 1 further comprising:

in response to determining that the knowledge base does not include the response that correlates to the request for performance information of the target item, one or more processors determining from the knowledge base, a helper computing device having context information most similar to the context information of the first computing device;

one or more processors sending a message requesting participation by a user of the helper computing device for communication with a user of the first computing device, regarding the target item; and in response to receiving a declining response to participate from the user of the helper computing device, one or more processors sending a message requesting participation by a user of a next-helper computing device having a next-most similar context information, for communication with a user of the first computing device, regarding the target item.

4. The method of claim 1, wherein the context information of the first computing device and the context information of the second computing device is obtained by a communicative connection to a context information collection application downloaded to the first computing device and the second computing device.

5. The method of claim 1, wherein the request for performance information includes business rules, wherein the business rules apply priority to user-identified elements of the context information of the first computing device.

6. The method of claim 1, wherein context information corresponding to multiple computing devices stored in the knowledge base are scored based on the extent of similarity to the context information of the first computing device.

7. The method of claim 1, wherein the context information includes one or more elements selected from a group consisting of: device model, device version, device processor, device operating system (OS), OS version, firmware version, memory type, memory capacity, storage capacity, installed applications, concurrent running applications, GPS functions, camera functions, connected devices, integrated features, battery capacity, battery condition, network connections, location of smart device, altitude of smart device, and ambient temperature.

8. A computer program product for determining performance information of a target item operating with a computing device, the computer program product comprising:

one or more computer readable storage media and program instructions stored on the one or more computer readable storage media, the program instructions comprising:

program instructions to receive a request from a user of a first computing device for performance information about operation of a first target item under a context associated with the first computing device and a set of existing items associated with the first computing device, wherein the first target item includes a target item profile that includes input by the requesting user;

program instructions to search for a response to the request in a knowledge base containing context specific performance information of target item operation associated with multiple computing devices;

program instructions to identify from the knowledge base a response to the request for performance information of the target item having the target item profile and operating with a second computing device under the context information similar to the first computing device and the set of existing items, wherein the response includes a ranking of most similar to the first target item and the context associated with the first computing device and the set of existing items;

program instructions to send the response with the ranking most similar to the first target item and the context information of the first computing device with the set of existing items, including the performance information, and enabling a connection to the second computing device from the first computing device; and program instructions to initiate a communication between the first computing device and a second computing device enabling sending of queries from the user of the first computing device to a second user of the second computing device regarding the request for performance information of the first target item.

9. The computer program product of claim 8, wherein program instructions to initiate the communication channel between the first computing device and the second computing device further comprises:
   program instructions to send a message requesting participation by a user of the second computing device for communication with a user of the first computing device, regarding the target item; and
   in response to receiving an opt-in agreement to participate from the user of the second computing device, program instructions to establish an anonymous communication channel between the first computing device and the second computing device.

10. The computer program product of claim 8, further comprising program instructions, stored on the one or more computer readable storage media, to:
   in response to determining that the knowledge base does not include the response that correlates to the request for performance information of the target item, determine from the knowledge base, a helper computing device having context information most similar to the context information of the first computing device;
   send a message requesting participation by a user of the helper computing device for communication with a user of the first computing device, regarding the target item; and
   in response to receiving a declining response to participate from the user of the helper computing device, send a message requesting participation by a user of a next-helper computing device having a next-most similar context information, for communication with a user of the first computing device, regarding the target item.

11. The computer program product of claim 8, wherein the context information of the first computing device and the context information of the second computing device is obtained by a communicative connection to a context information collection application downloaded to the first computing device and the second computing device.

12. The computer program product of claim 8, wherein the request for performance information includes business rules, wherein the business rules apply priority to user-identified elements of the context information of the first computing device.

13. The computer program product of claim 8, wherein context information corresponding to multiple computing devices stored in the knowledge base are scored based on the extent of similarity to the context information of the first computing device.

14. The computer program product of claim 8, wherein the context information includes one or more elements selected from a group consisting of: device model, device version, device processor, device operating system (OS), OS version, firmware version, memory type, memory capacity, storage capacity, installed applications, concurrent running applications, GPS functions, camera functions, connected devices, integrated features, battery capacity, battery condition, network connections, location of smart device, altitude of smart device, and ambient temperature.

15. A computer system for determining performance information of a target item operating with a computing device comprising:
   one or more computer processors, one or more computer readable storage media, program instructions stored on the computer readable storage media for execution by at least one of the one or more processors, the program instructions comprising:
   program instructions to receive a request from a user of a first computing device for performance information about operation of a first target item under a context associated with the first computing device and a set of existing items associated with the first computing device, wherein the first target item includes a target item profile that includes input by the requesting user;
   program instructions to search for a response to the request in a knowledge base containing context specific performance information of target item operation associated with multiple computing devices;
   program instructions to identify from the knowledge base a response to the request for performance information of the target item having the target item profile and operating with a second computing device under the context information similar to the first computing device and the set of existing items, wherein the response includes a ranking of most similar to the first target item and the context associated with the first computing device and the set of existing items;
   program instructions to send the response with the ranking most similar to the first target item and the context information of the first computing device with the set of existing items, including the performance information, and enabling a connection to the second computing device from the first computing device; and
   program instructions to initiate a communication between the first computing device and a second computing device enabling sending of queries from the user of the first computing device to a second user of the second computing device regarding the request for performance information of the first target item.

16. The computer system of claim 15, wherein program instructions to initiate the communication channel between the first computing device and the second computing device further comprises:
   program instructions to send a message requesting participation by a user of the second computing device for communication with a user of the first computing device, regarding the target item; and
   in response to receiving an opt-in agreement to participate from the user of the second computing device, program instructions to establish an anonymous communication channel between the first computing device and the second computing device.

17. The computer system of claim 15, further comprising program instructions, stored on the computer readable storage media for execution by at least one of the one or more processors, to:
   in response to determining that the knowledge base does not include the response that correlates to the request for performance information of the target item, determine from the knowledge base, a helper computing device having context information most similar to the context information of the first computing device;
   send a message requesting participation by a user of the helper computing device for communication with a user of the first computing device, regarding the target item; and
   in response to receiving a declining response to participate from the user of the helper computing device, send a message requesting participation by a user of a next-helper computing device having a next-most similar context information, for communication with a user of the first computing device, regarding the target item.

18. The computer system of claim 15, wherein the context information of the first computing device and the context information of the second computing device is obtained by a communicative connection to a context information collection application downloaded to the first computing device and the second computing device.

19. The computer system of claim 15, wherein the request for performance information includes business rules, wherein the business rules apply priority to user-identified elements of the context information of the first computing device.

20. The computer system of claim 15, wherein the context information includes one or more elements selected from a group consisting of: device model, device version, device processor, device operating system (OS), OS version, firmware version, memory type, memory capacity, storage capacity, installed applications, concurrent running applications, GPS functions, camera functions, connected devices, integrated features, battery capacity, battery condition, network connections, location of smart device, altitude of smart device, and ambient temperature.

\* \* \* \* \*